United States Patent [19]

Fitzsimmons et al.

[11] 4,170,773
[45] Oct. 9, 1979

[54] PRECISION APPROACH SENSOR SYSTEM FOR AIRCRAFT

[75] Inventors: George W. Fitzsimmons, Lynnwood; Lawrence W. Robinson, Seattle; Jim S. Takeuchi, Mercer Island, all of Wash.

[73] Assignee: The Boeing Company, Seattle, Wash.

[21] Appl. No.: 903,312

[22] Filed: May 5, 1978

[51] Int. Cl.$^2$ .............................................. G01S 9/56
[52] U.S. Cl. ..................................... 343/6.5 R; 343/10
[58] Field of Search .................. 343/6.5 R, 11 R, 14, 343/10

[56] References Cited

U.S. PATENT DOCUMENTS

| | | | |
|---|---|---|---|
| 2,528,119 | 10/1950 | Crosby | 343/6.5 R X |
| 2,582,971 | 1/1952 | Dunmore | 343/11 R |
| 2,981,943 | 4/1961 | Dodington | 343/6.5 R X |
| 3,290,677 | 12/1966 | Jacob | 343/10 |
| 3,366,954 | 1/1968 | Stahler | 343/12 R |
| 3,461,452 | 8/1969 | Welter | 343/14 X |
| 3,917,196 | 11/1975 | Pond et al. | 343/5 DP X |

Primary Examiner—T. H. Tubbesing
Attorney, Agent, or Firm—Thomas H. Murray

[57] ABSTRACT

A microwave interrogation-transponder system for controlling the airborne rendezvous and closure of two aircraft for aerial refueling and the like. The system of the invention includes a microwave interrogator mounted on the aft underfuselage of a tanker aircraft, for example, for interrogating and receiving a reply from a small microwave transponder mounted on the receiver aircraft near the aerial refueling receptacle. The angle of the received signal relative to the tanker is obtained from the angle sensing receiver portion of the microwave interrogator; whereas range is obtained from the phase of the returned modulation tone (i.e., a range tone) relative to that which was transmitted by the interrogator. The transponder sends back to the interrogator a signal which is shifted in frequency with respect to the transmitted signal and operates in an active mode with gain at long ranges and in a passive mode with no gain at shorter ranges to achieve extremely accurate guidance characteristics.

4 Claims, 3 Drawing Figures

$f_x$ = RADAR TRANSMITTER FREQUENCY
$f_T$ = TRANSPONDER RETURN FREQUENCY
   = $f_x \pm f_o$
$f_o$ = TRANSPONDER OFFSET FREQUENCY
$f_m$ = RANGE TONE MODULATION FREQUENCY

PRECISION APPROACH SENSOR SYSTEM FOR AIRCRAFT

BACKGROUND OF THE INVENTION

While not limited thereto, the present invention is particularly adapted for use in an airborne rendezvous and closure of two aircraft for the purpose of aerial refueling. Such refueling procedures are hazardous without good visibility conditions using present techniques. Normal aircraft radars have insufficient resolution at close range to permit closing to less than 500 feet. As a result, human visibility is needed for the last few hundred feet which are the most critical. The entire operation depends upon the skill of the receiver-aircraft pilot and boom operator without any other aids other than radio communication until a hook-up has been achieved, at which time boom sensors provide position data.

Laser systems, such as that shown in U.S. Pat. No. 3,917,196, have been provided for aircraft rendezvous and closure wherein a modulated light beam from one aircraft is reflected from another aircraft by a retroreflector. Azimuth and elevation positions are obtained by focusing the reflected light beam onto the face of an image disector tube; while range is determined by comparing the phases of the transmitted and received light beam modulation. Such laser systems are extremely accurate; however they cannot be used under certain cloud conditions and have a range no greater than about 500 feet under high background lighting conditions. As a result, other means must be provided for guiding a trailing aircraft beyond that range and under cloudy conditions.

SUMMARY OF THE INVENTION

In accordance with the present invention, a precision approach system for aircraft is provided which can be used for airborne rendezvous under all weather conditions and, at the same time, does not require visibility between the two aircraft. This is achieved with a radar-transponder system in which a radar carrier signal transmitted from one aircraft is translated in frequency by a transponder on another aircraft and sent back to the original aircraft. The radar carrier signal is modulated with a range tone signal such that range can be determined by a phase shift in the returned range tone in accordance with CW radar techniques.

At ranges beyond a predetermined minimum range, the transponder operates in an active mode wherein a voltage controlled local oscillator is phase-locked to the received radar signal, the output of which is transmitted back to the other aircraft with gain. This involves a time delay uncertainty in the transponder; however the active mode is used only at longer ranges where accuracy is of secondary importance. At ranges below a predetermined minimum range, on the order of 1000 feet, the transponder operates in the passive mode wherein the received signal is simply frequency translated by mixing with that from an offset generator and reradiated without any gain or any processing except perhaps filtering. Thus, a minimum fixed time delay is achieved in the passive mode at shorter ranges where gain is not required in the transponder for extreme accuracy in range.

Angle sensing by the interrogating aircraft may be achieved by any one of several conventional means. For example, a monopulse antenna and receive system may be used or one might employ a conical scanning technique.

Specifically, there is provided in accordance with the invention radar means on one of two aircraft for directing radio wave energy toward the other aircraft at a carrier frequency $f_x$, means for modulating the carrier frequency with a range tone, transponder means on the other aircraft actuable in response to receipt of carrier wave energy at the frequency $f_x$ for directing carrier wave energy modulated by the range tone back to the first aircraft at a carrier frequency $f_t$ which is displaced in frequency with respect to $f_x$, and means incorporated into the radar means responsive to the signal received from the transponder for determining the range of the other aircraft and its angular position with respect to the aircraft from which the original radar signal was transmitted. As was explained above, the transponder means operates in an active mode with signal gain at ranges beyond a predetermined minimum range and operates in a passive mode with no gain at ranges less than the aforesaid predetermined minimum range.

The above and other objects and features of the invention will become apparent from the following detailed description taken in connection with the accompanying drawings which form a part of this specification, and in which.

Figure 1:
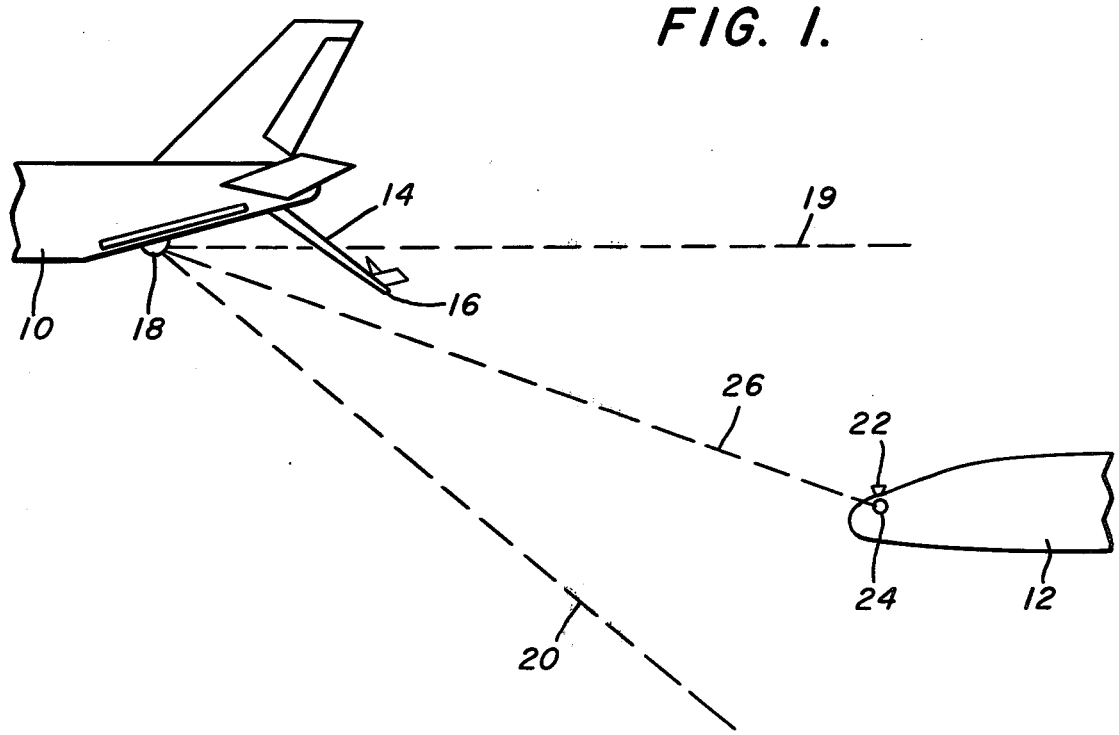
FIG. 1 is a schematic illustration of two closing aircraft showing the locations of the microwave interrogator on one aircraft and the microwave transponder on the other aircraft.

With reference now to the drawings, and particularly to FIG. 1, there are shown two aircraft 10 and 12; and it will be assumed that the aircraft 12 is closing on aircraft 10 for a refueling operation. The tanker aircraft 10 is provided with a refueling boom 14 having a nozzle 16 at its lower end. Carried on the aft underfuselage of the tanker aircraft 10 is a microwave or radar interrogator 18 provided with an antenna which transmits a conical pattern bounded by the broken lines 19 and 20. Within the field of view of the radar 18 is the aircraft 12 provided with an aerial refueling receptacle 22. Immediately adjacent the receptacle 22 is a microwave transponder 24, hereinafter described in greater detail, which detects the wave energy emitted by the radar 18 and retransmits the signal back to the radar along the path 26 at a carrier frequency displaced with respect to the original radar carrier frequency.

The radar interrogator 18 is of the CW (continuous wave) type rather than the pulsed type. The carrier frequency is modulated with a range tone such that when the signal is retransmitted back to the radar 18 from the transponder 24, the range can be determined by comparison of the phase of the received range tone signal with that originally transmitted. The angle of the received signal relative to the aircraft 10 is obtained from the angle receiver portion of the radar 18. As will be understood, multiple range tones (which includes simultaneous multiple range tones) can be used to resolve range ambiguity.

In operation, the aircraft 12 is first acquired at a range of about 10 miles or more within the acquisition cone defined by the broken lines 19 and 20. Fly-up data then enables the aircraft 12 to stay within the acquisition cone to rendezvous at a refueling position a few hundred feet aft the tanker aircraft 10. From this position on, one of two means can be employed to complete the refueling task. The first of these is to employ a precision high resolution laser sensor system, such as that described in the aforesaid U.S. Pat. No. 3,917,196, which will automatically handle the refueling including fly-up into the hook-up position. Alternatively, the laser system may only be required to supply data to assist the receiver aircraft pilot and boom operator in performing a manual refuel. When a laser system of this type is used, the microwave system will continue to be used during refueling to provide a back-up function which will sense a failure within the laser sensor. In the event of clouds that could blind a laser sensor, the microwave system will be largely unaffected at close range and can significantly improve the speed and safety associated with aerial refueling with a laser sensor alone.

Alternatively, the microwave sensor system of the invention can be employed at close range without the use of a laser sensor. In this case, the microwave sensor system provides the position and velocity data to the pilot of aircraft 12 and the boom operator on aircraft 10 to better accomplish a manual refuel.

Figure 2:
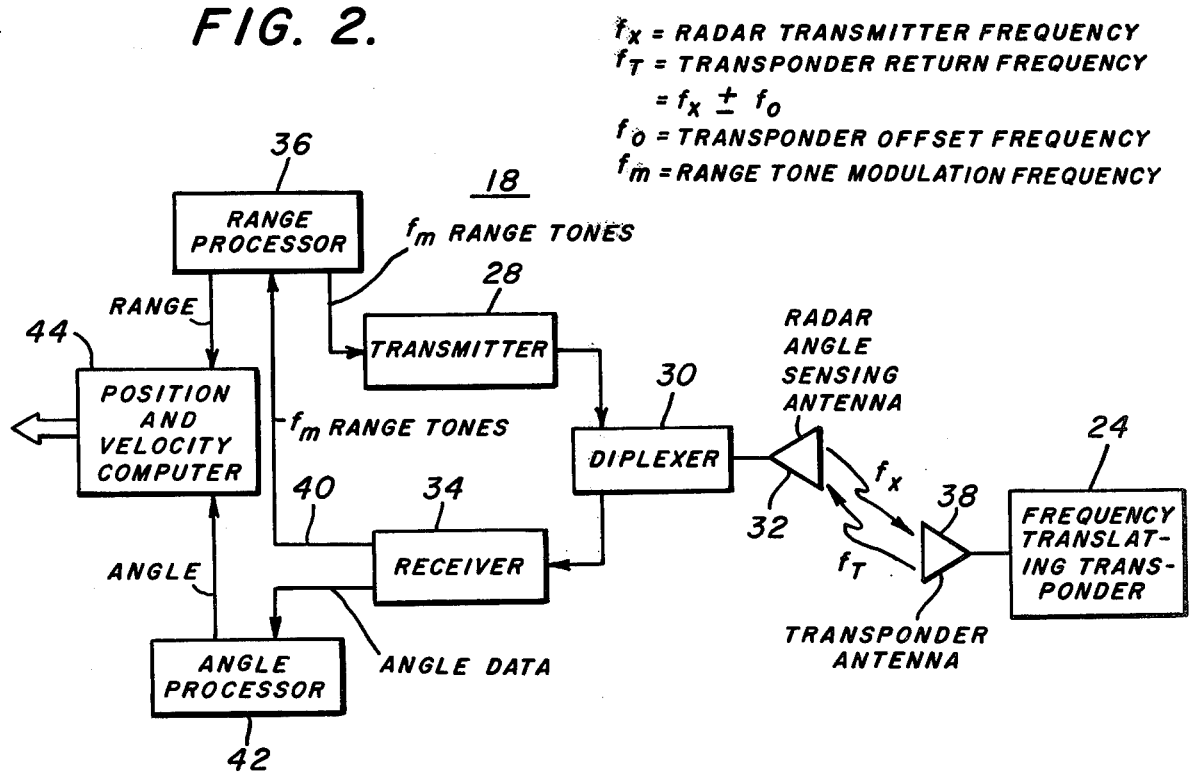
FIG. 2 is a block diagram of the microwave sensor system of the invention.

A block diagram of the basic microwave sensor system of the invention is shown in FIG. 2 where the tanker radar interrogator is again indicated by the reference numeral 18; while the transponder is again indicated by the reference numeral 24. The interrogator includes a transmitter 28 connected through a diplexer 30 to an antenna 32. The antenna 32 is also connected through the diplexer 30 to receiver 34. Antenna 32, which must sense the angles between the two aircraft, can either be a gimbaled monopulse antenna, a gimbaled conical scan antenna, a fixed monopulse antenna or a two-dimensional phased array. The transmitter 28 transmits a carrier frequency $f_x$ phase modulated by a range tone signal $f_m$ derived from range processor 36. This modulated carrier signal is intercepted by the transponder antenna 38 and then passes to the frequency translating transponder 24 where the carrier frequency is shifted to a new frequency, $f_t$, which is equal to the original radar frequency $f_x \pm f_o$, where $f_o$ is the transponder offset frequency. The carrier signal at frequency $f_t$ is then transmitted from antenna 38 back to the antenna 32 where it passes through the diplexer 30 to the receiver 34 and is demodulated to derive the range tone signal on lead 40, which is now shifted in phase as a function of range. The receiver 34 also sends signals to an angle processor 42 which determines the angles of the trailing aircraft 12 with respect to the tanker aircraft. The phase-shifted range tone signal on lead 40 is applied to the range processor 36 where it is compared in phase with the original range tone signal in order to derive a signal proportional to range, this being determined by the phase shift between the received and transmitted range tone signals. The range and angle information from processors 36 and 42 are then applied to a position and velocity computer which computes the position and relative velocity of aircraft 12 with respect to aircraft 10.

As was explained above, the transponder 24 translates the received, modulated carrier frequency $f_x$ to a new frequency $f_t$, complete with the modulation, and reradiates the translated signal back to the tanker radar with minimum delay. At close range, the transponder operates in the passive mode and consists of a simple mixer driven by an oscillator at the offset frequency $f_o$. In this mode, the transponder reradiates a signal at frequency $f_t$ which is above or below the received signal, $f_x$, by an amount equal to the offset frequency $f_o$. Passive translation of this sort may be achieved with on the order of 10 db loss or less with a very small, fixed time delay.

While the passive mode of operation described above can be utilized at close ranges, the range of the microwave sensor system will be very limited unless a second mode of operation is provided wherein the translation is accomplished with gain. In this mode, called the active mode, a larger time delay inherently exists associated with the signal processing required. As a result, in the active mode, the delay uncertainties may be too great to permit operation at very short ranges. For these reasons, the transponder 24 operates in an active and passive mode. In the active mode, an aircraft, such as aircraft 12, can be acquired at many miles of range with only modest accuracy. The passive mode, which has minimum delay bias range errors, is used from about one thousand feet of range down to just a few tens of feet of range.

Figure 3:
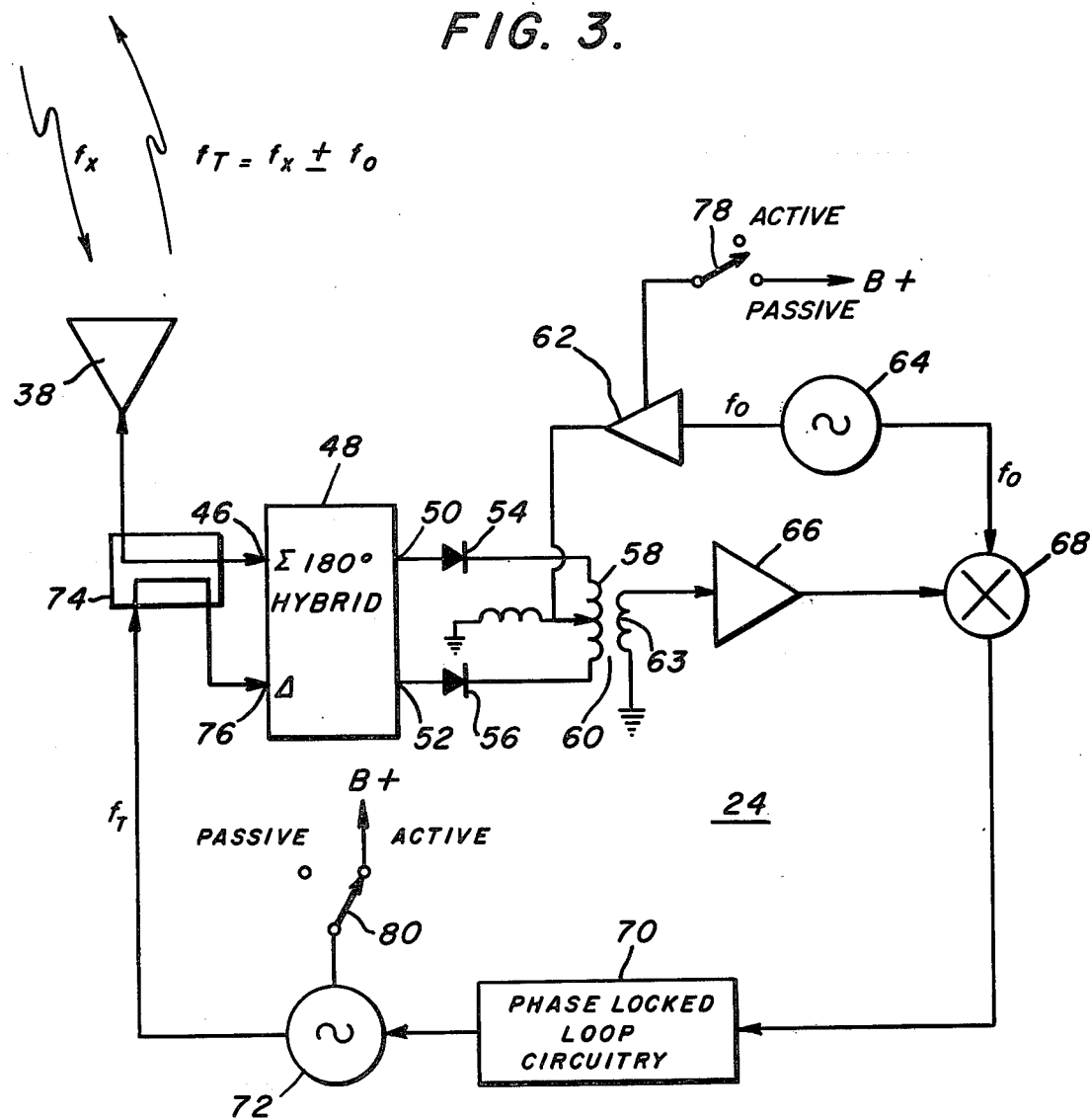
FIG. 3 is a schematic circuit diagram of the dual mode phase-locked active/passive transponder of the invention.

The details of one type of transponder which can be used in accordance with the invention are illustrated in FIG. 3. The antenna 38 is connected to the sum port 46 of a 180° hybrid where it passes through ports 50 and 52 to the anodes of two mixer diodes 54 and 56. The cathodes of the diodes 54 and 56 are, in turn, connected to the opposite ends of a primary winding 58 of transformer 60. The center tap on the primary winding 58 is connected through amplifier 62 to the output of a translation oscillator 64 which oscillates at the offset frequency $f_o$. The secondary winding 63 of transformer 60 is connected through IF amplifier 66 to one input of a mixer 68, the other input being connected to the translation oscillator 64. The output of mixer 68 is connected through phase-locked loop circuitry 70 to a microwave oscillator 72 which will oscillate at frequency $f_t$. The output of the oscillator 72, which is disabled or turned OFF during the passive mode of operation, is connected through a directional coupler 74 to the difference port 76 of the 180° hybrid 48. Assuming that oscillator 72 is operating, part of the wave energy at frequency $f_t$ will be coupled through the directional coupler 74 to the antenna 38 for reradiation back to the microwave interrogator 18. The remaining part of the wave energy will be applied through the difference port 76 to the two diodes 54 and 56.

The operation of the transponder of FIG. 3 is as follows: In the passive mode (i.e., close ranges), the received phase modulated signal at frequency $f_x$ is conducted to both mixer diodes in phase. During the passive mode, the amplifier 62 is connected to a source of B+ voltage through switch 78. Consequently, the output of the translation oscillator 64 at frequency $f_o$ will also be applied to the mixer diodes 54 and 56 in phase. The sum and difference signals created through the mixing process cancel at the difference port 76 of the 180° hybrid 48 and add at the sum port where they are conducted to the antenna 38 to be radiated back to the interrogator 18 which may be provided with a filter which will pass either a signal having a frequency $f_x + f_o$ or $f_x - f_o$. As was explained above, in this mode of operation, a minimum time delay is encountered; however the amplitude of the reradiated signal is such that it can be detected by the interrogator 18 at close ranges only.

In the active mode of operation of the transponder, the switch 78 is opened such that the diodes 54 and 56 are effectively isolated from the translation oscillator 64. At the same time, the microwave oscillator 72 is connected to a B+ voltage source through switch 80. As explained above, part of the wave energy from oscillator 72 is coupled through coupler 74 to the antenna 38 and the remainder passes through the difference port 76 of hybrid 48 to both diodes 54 and 56 180° out of phase at frequency $f_t$. The resulting intermediate frequency signal is coupled through transformer 60 to the IF amplifier 66 where it is amplified. Thereafter, it is coherently detected in the mixer 68, which also receives a signal from translation oscillator 64 at frequency $f_o$. The intermediate frequency signal, through the action of the phaselocked loop circuitry 70 is used to phase lock the microwave oscillator 72 to the selected return frequency $f_t = f_x \pm f_o$. The microwave oscillator is thus forced to track the phase of the phase modulated signal and, consequently, is a duplicate of the signal $f_x$ received except displaced in frequency by an amount equal to $f_o$. The output of the oscillator 72 is coupled to the antenna 38 through the directional coupler 74. This amplified, reradiated signal thus enables relatively long range acquisition and tracking.

As will be appreciated, the inherent delay through the transponder of FIG. 3 in the active mode is necessarily quite long. As a result, range accuracy is impaired due to delay uncertainty; however active mode range errors are quite acceptable up to a range of a few hundred feet. At approximately 1000 feet of range, the system will be switched from the active to the passive mode where range errors due to delay variations from unit-to-unit should be less than ±1 inch of range.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. A precision approach system for two aircraft comprising radar means on one of said aircraft for directing radio wave energy toward the other aircraft at a carrier frequency $f_x$, means for modulating said carrier frequency with a range tone, transponder means on the other aircraft for receiving wave energy at frequency $f_x$, said transponder means including a mixer for mixing wave energy received at frequency $f_x$ with a signal at frequency $f_o$ to produce a signal at frequency $f_t$ which is equal to $f_x \pm f_o$, means in said transponder for modulating carrier wave energy at frequency $f_t$ with said range tone and for directing the modulated carrier wave energy at frequency $f_t$ back to said first aircraft, said transponder means operating in an active mode with signal gain at ranges beyond a predetermined range and operating in a passive mode with no gain at ranges less than said predetermined range, said active mode being effected by an oscillator which is coupled to said mixer in the transponder means and which oscillates at the frequency $f_t$ only when the transponder is operating in the active mode, and means incorporated into said radar means responsive to the signal received from said transponder means for determining the range of said other aircraft and its angular position with respect to said one aircraft.

2. The system of claim 1 wherein said means for determining range comprises means for comparing the phase of said range tone as transmitted from said one aircraft with the phase of the range tone as received by said one aircraft.

3. The system of claim 1 including position and velocity computer means coupled to said means for determining range and angular position.

4. The system of claim 1 wherein said oscillator is connected to said mixer in the transponder through phase-locked loop circuitry to lock the oscillator to said frequency $f_t$.

* * * * *